(12) United States Patent
Häberlein

(10) Patent No.: US 7,279,021 B2
(45) Date of Patent: Oct. 9, 2007

(54) SUCTION DEVICE/BLOWER

(75) Inventor: Jürgen Häberlein, Murrhardt (DE)

(73) Assignee: Andreas Stihl AG & Co. KG (DE)

(*) Notice: Subject to any disclaimer, the term of this patent is extended or adjusted under 35 U.S.C. 154(b) by 318 days.

(21) Appl. No.: 11/069,709

(22) Filed: Mar. 1, 2005

(65) Prior Publication Data
US 2005/0229556 A1    Oct. 20, 2005

(30) Foreign Application Priority Data
Mar. 2, 2004    (DE)    ........... 10 2004 009 979

(51) Int. Cl.
*B01D 29/11*    (2006.01)
(52) U.S. Cl. .............. 55/360; 15/349; 15/352; 55/374; 55/382; 55/473; 55/DIG. 2; 55/DIG. 45
(58) Field of Classification Search ............ 55/360, 55/374, 381–382, 473, DIG. 2, DIG. 3, DIG. 28, 55/DIG. 45; 15/347, 349, 352
See application file for complete search history.

(56) References Cited

U.S. PATENT DOCUMENTS

| | | | |
|---|---|---|---|
| 2,684,126 A * | 7/1954 | Doyle, Sr. ............ | 55/360 |
| 3,721,071 A * | 3/1973 | Mueller et al. ........ | 55/360 |
| 3,986,530 A * | 10/1976 | Maekawa ............ | 139/425 R |
| 4,290,165 A | 9/1981 | Hiramatsu et al. ...... | 15/330 |
| 4,322,232 A | 3/1982 | Beane ................ | 55/360 |
| 4,531,957 A * | 7/1985 | Malik ................ | 55/360 |
| 5,005,470 A * | 4/1991 | Denker ............... | 454/63 |
| 5,150,499 A | 9/1992 | Berfield ............. | 15/327.1 |
| 5,527,569 A * | 6/1996 | Hobson et al. ........ | 428/35.2 |
| 6,552,891 B1 | 4/2003 | Prach ................ | 361/212 |

FOREIGN PATENT DOCUMENTS

WO    WO93/00035    1/1993

* cited by examiner

*Primary Examiner*—Richard L. Chiesa
(74) *Attorney, Agent, or Firm*—Robert W. Becker; Robert W. Becker & Associates

(57) ABSTRACT

A manually-guided, portable suction device/blower is provided, and includes a blower unit having a motor for driving the blower unit, a blower tube that extends from the blower unit, a collection bag, wherein during suction operation of the suction device/blower, the blower tube opens out into the collection bag, and a potential-equalizing device disposed within the collection bag, wherein the potential-equalizing device is electrically conductively connected with an electrical ground connection of the suction device/blower.

11 Claims, 3 Drawing Sheets

SUCTION DEVICE/BLOWER

BACKGROUND OF THE INVENTION

The present invention relates to a manually-guided, portable suction device/blower.

With manually-guided, portable suction devices/blowers, an air stream is produced by means of a motor-driven blower unit. By means of a suction or vacuum tube that is connected, for example, on the suction side of the suction device/blower, dust, leaves or the like can be sucked up from the ground and blown into a collection bag via a blower tube that is disposed on the discharge side.

Embodiments are also known where an underpressure device, for example in the form of a venturi device, which is actuated by the air stream, is disposed in the blower tube. In this connection, a suction tube opens out into the venturi device. Matter can be drawn in through the suction tube and the venturi device and can be conveyed further via the blower tube to the collection bag, without having to pass the blower unit that drives the air stream. Such arrangements are used in particular to suck up larger or harder or sensitive matter, especially for harvesting nuts or the like.

The aforementioned suction devices/blowers are carried, for example, on the back and are manually guided. The housing of the blower unit, and in particular the blower tube, are made of plastic, which acts as an electrical insulator relative to the drive motor.

At an appropriate blower power, a relatively high flow velocity forms in the blower tube. At appropriate atmospheric conditions, and when sucking up atmospheric air that is loaded with dirt or dust particles, this high velocity can lead to electrostatic charges, especially due to friction between the particles and the fanwheel blower, the blower housing, and with the wall of the blower tube. The electrically charged particles carried along in the air stream have an electrical potential difference relative to the surrounding components. The particles themselves, and in particular components of the suction device/blower, develop an electrical potential relative to one another and also relative to the environment. When the suction device/blower, and in particular the collection bag, are contacted, an electrostatic discharge that is uncomfortable for the operator can occur.

It is therefore an object of the present invention to provide a suction device/blower of the aforementioned general type with which the formation of an electrostatic charge is at least largely avoided.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
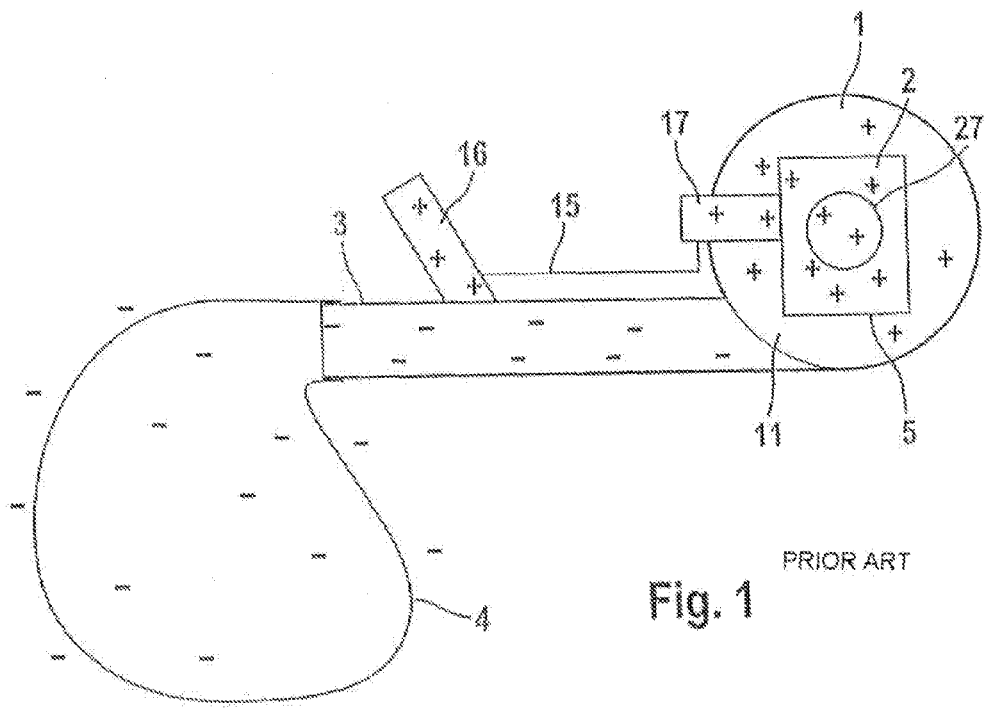
FIG. 1 is a block diagram showing the essential components of a suction device/blower pursuant to the state of the art.

The suction device/blower of the present application comprises a potential-equalizing device that is disposed within the collection bag and is electrically conductively connected with an electrical ground connection of the suction device/blower. Dust particles, or other particles that are carried along in the air stream and during the course of the flow route are electrically charged, lead, when striking the inner surface of the collection bag, to the electrostatic charging thereof. By means of the electrical contacting of the potential-equalizing device of the collection bag with the electrical ground connection the resulting charge of the collection bag is shunted to ground. To a corresponding extent, the potential difference between the collection bag and the atmosphere is also reduced or eliminated. The collection bag can readily be contacted without this leading to an uncomfortable electrostatic discharge between the collection bag and the operator.

Pursuant to an advantageous further development, the potential-equalizing device has a flexible design. In particular in conjunction with a flexible collection bag, for example formed of a woven material, the shape can adapt to the air stream or the degree of filling of the collection bag without mechanically overstressing the bag. When not being used, the collection bag, along with the potential-equalizing device, can be easily folded and stored.

The potential-equalizing device is expediently embodied as an arrangement of electrically conductive, especially metallic, threads, whereby the collection bag is advantageously made of a woven material that includes the electrically conductive threads. As a consequence of the electrically conductive threads, the potential-equalizing device can have a flat and flexible configuration. A potential equalization can take place at any desired location of the collection bag. The formation of individual, insular locations not having potential-equalization is avoided. A woven material that includes the electrically conductive threads can have mechanical and electrical characteristics that are easily adapted to requirements. A thread or fiber fraction having greater mechanical resistance can be selected that while allowing a thin and lightweight configuration of the woven material provides an adequate load-carrying capacity. Any desired percentage of electrically conductive threads can be established as necessary for a reliable potential equalization. In particular, an embodiment of the woven material, or of the collection bag produced therefrom, is possible that entirely contains conductive fibers.

Pursuant to an expedient alternative, the potential-equalizing device is embodied as an electrically conductive, film-like coating of the collection bag. A reliable, laminar charge accommodation is possible. At the same time, the film-like coating can contribute in a desired manner to the imperviousness of the collection bag.

Pursuant to one expedient embodiment, the electrical ground connection of the suction device/blower is formed by the motor, and in particular by a housing of the motor. In conjunction with an embodiment of the suction device/blower having an internal combustion engine as the drive motor, and the absence of a ground connection cable of an electrical current supply, a reliable potential equalization is
} ensured within the device without having to provide charge shunting by a power supply cable or the like.

The potential-equalizing conductor expediently extends on the inside through a discharge elbow of the blower unit, whereby the end of the potential-equalizing conductor that is close to the motor is fixed to the motor within the blower unit in the region of the discharge elbow, in particular by means of a motor mounting bolt. Also in this region it is not necessary to have an opening through the blower unit housing for the equalizing conductor. Also in the region of the discharge elbow the equalizing conductor can contribute to potential equalization. By means of the motor mounting bolt that is present with known devices, and projects into the discharge elbow, a reliable ground connection is provided without additional expense.

Pursuant to an advantageous further development, the potential-equalizing device of the collection bag is electrically conductively connected with a further potential-equalizing device in the blower tube. By means of the potential-equalizing device in the blower tube, it is already possible during the course of the flow path to prevent or at least reduce the formation of electrostatic charges. Charges that possibly form can still be shunted in the blower tube, as a consequence of which the potential difference that is established in the collection bag is reduced. The potential-equalizing device in the collection bag is relieved, and even while having a very simple design can reliably carry out a potential equalization of residual charges that might be present.

Further specific features of the present application will be described in detail subsequently.

DESCRIPTION OF SPECIFIC EMBODIMENTS

Referring now to the drawings in detail, FIG. 1, in a schematic block diagram, shows the essential components of a manually-guided, portable suction device/blower pursuant to the state of the art. The blower has a blower or fan unit 1, which is driven by a motor 2. In the illustrated embodiment, the motor 2 is an internal combustion engine having an indicated carburetor 17. An electric motor or the like can also be provided. The blower unit 1 is provided with a discharge elbow 11 which is followed by a discharge or blower tube 3 that continues from the blower unit 1. The free end of the blower tube 3 opens into a collection bag 4. By means of a central suction or intake opening 27 of the blower unit 1, and a non-illustrated intake tube connected thereto, an air stream can be drawn in and conveyed via the blower tube 3 into the collection bag 4.

A handle 16 having control elements for the motor 2 is mounted on the outside of the blower tube 3. From the control elements on the handle 16, for example, a gas or throttle cable 15 leads to the carburetor 17. The gas cable 15 is electrically conductive, as a result of which the handle 16 as well as the motor 2 with the carburetor 17 have the same electrical potential. As a result of the particles, which are carried along in the air stream, rubbing together as well as with the walls of the discharge elbow 11 and the blower tube 3, there results in this region a negative electrostatic charge of the particles in the air stream, as indicated by minus signs. In contrast, and also in contrast to the environment, the region of the motor 2, of the handle 16, and of a housing of the blower unit 1, has a positive potential difference as indicated by plus signs. The negatively charged dust particles strike the inside of the collection bag 4, as a result of which the collection bag also receives a negative charge or potential difference relative to the environment, as indicated by minus signs. Contact with the suction device/blower, and in particular the negatively charged collection bag 4, can lead to undesirable discharge.

Figure 2:
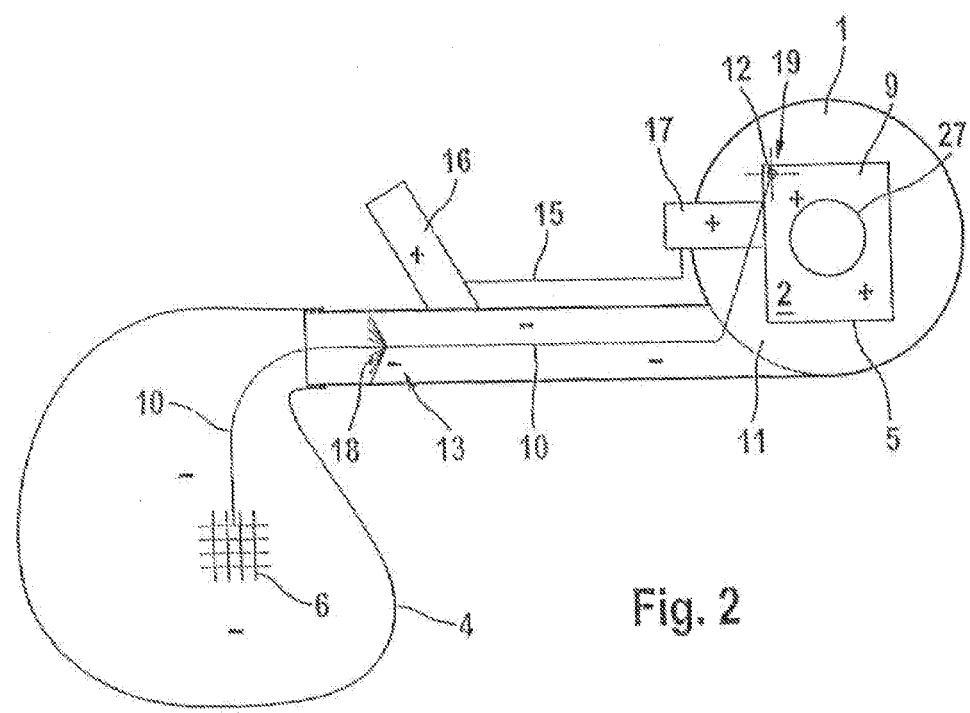
FIG. 2 shows the arrangement of FIG. 1 with a potential-equalizing conductor that extends through the blower tube and that is connected to an inner potential-equalizing device of a collection bag.

FIG. 2 shows the inventive further development of the arrangement of FIG. 1, according to which a potential-equalizing conductor 10, which is electrically conductively connected with the motor 2, extends on the inside of the blower tube 3. In an electrically conductive manner, the potential-equalizing conductor 10 connects an inner potential-equalizing device 6 of the collection bag 4 with an electrical ground connection 5 of the suction device/blower. In the illustrated embodiment, the electrical ground connection 5 is formed by a housing 9 of the motor 2. For this purpose, for example, the ground conductor of an electrical drive motor or the like can also be provided. In the region of its free end 19, the potential-equalizing conductor 10 is electrically conductively fixed to the motor 2 via a motor mounting screw or bolt 12. A further potential-equalizing device 13 is provided within the blower tube 3 and is electrically conductively connected, via the potential-equalizing conductor 10, with the potential-equalizing device 6 of the collection bag 4 and with the electrical ground connection 5. In the illustrated embodiment, the potential-equalizing conductor 10 is centrally positioned in the blower tube 3 via radially projecting wires of an electrically conductive support spider 18. The potential-equalizing conductor 10 and the support spider 18 are provided over their entire length with a bare, electrically conductive surface via which the electrical charges can be received or collected. The further potential-equalizing device 13 is formed by the support spider 18 and the bare potential-equalizing conductor 10.

When an air stream is formed in the blower tube 3, the electrostatic charge resulting along the blower tube is collected over the entire length of the potential-equalizing conductor 10, and is equalized via the electrical contact with the motor 2. A further charge collection from the air stream is effected via the electrically conductive support spider 18. In this connection, the support spider collects electrostatic charges not only from the air stream over the entire cross-section thereof, but also from the inner walls of the blower tube 3. The remaining electrical charges are shunted off to the electrical ground connection 5 in a controlled manner via the potential-equalizing conductor 10.

Figure 3:
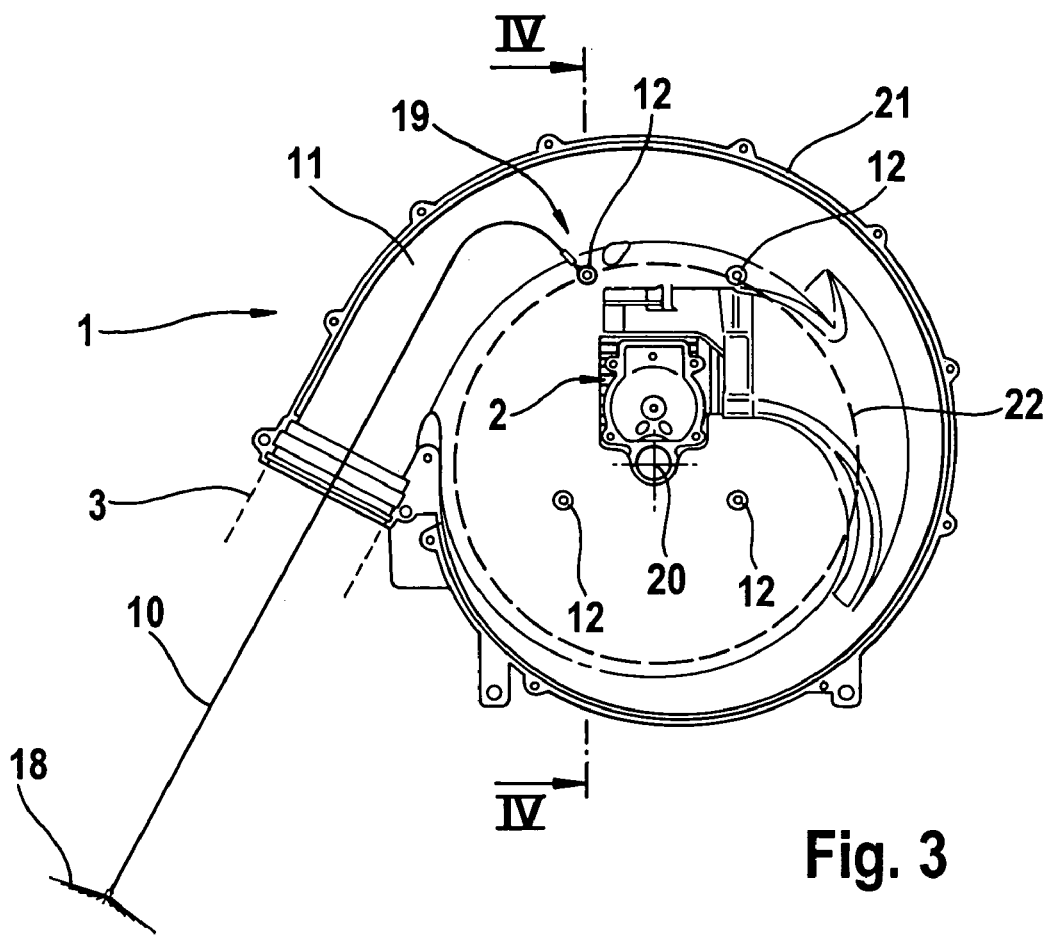
FIG. 3 shows details of the blower unit housing of the arrangement of FIGS. 1 and 2.

The side view of FIG. 3 shows details of the arrangement of FIG. 2 in the region of the blower unit 1. In the illustrated embodiment, the blower unit 1 is embodied as a radial blower having a spirally shaped blower housing. Shown of the blower housing is the inner side of a half shell 21 in which an indicated fanwheel blower 22 can be rotatably driven about an axis of rotation 20 via the motor 2. The spiral blower housing merges via a discharge elbow 11 into the indicated blower tube 3.

The motor 2 is disposed on the back side of the half shell 21 and is secured via motor mounting bolts 12 that extend through the end wall of the half shell 21. The potential-equalizing conductor 10 extends on the inside through the discharge elbow 11 of the blower unit 1 and on the inside of the blower unit, in the region of the discharge elbow 11, is electrically conductively connected with the motor 2 at the corresponding motor mounting bolt 12 disposed there.

Figure 4:
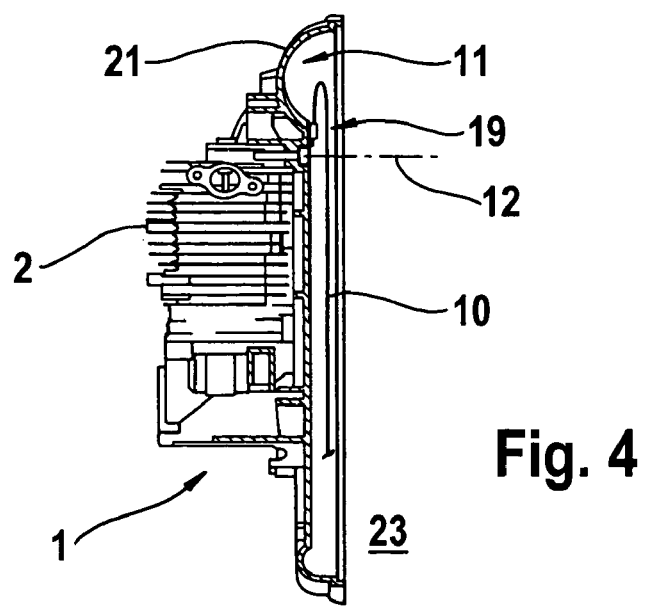
FIG. 4 is a cross-sectional illustration of the arrangement of FIG. 3

FIG. 4 is a cross-sectional illustration of the arrangement of FIG. 3 taken along the section line IV-IV. The motor 2 is fixed on the outside of the half shell 21 via the motor mounting bolts 12, whereby the motor mounting bolts extend through the side wall of the half shell 21.

On the inner side 23 of the housing of the blower unit, opposite the motor 2, an air stream is formed during operation that extends through the discharge elbow 11 and from there through the blower tube 3 (FIG. 3). In the region of its end 19, the potential-equalizing conductor 10 is disposed on the inner side 23 of the blower unit 1, where it is electrically conductively screwed, in the region of the discharge elbow 11, via the motor mounting bolt 12 with the motor 2, which is disposed on the outside.

Figure 5:
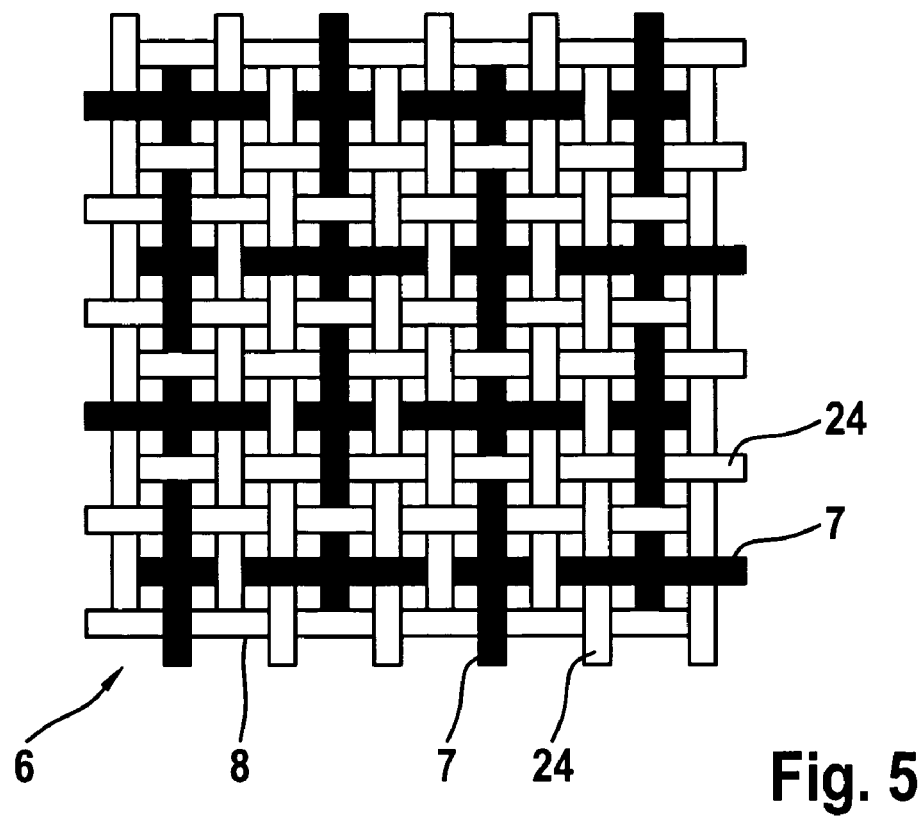
FIG. 5 schematically illustrates a woven material having electrically conductive threads for forming the potential-equalizing device of the collection bag.

The schematic illustration of FIG. 5 shows a woven material 8 from which the collection bag 4 (FIG. 2) is made, and via which the potential-equalizing device 6 in the collection bag is formed. In the illustrated embodiment, the woven material 8 is embodied as a blended fabric having primary threads 24 and electrically conductive threads 7. The electrically conductive threads 7 are metallic filaments, but can also be embodied as metallically coated threads, as electrically conductive threads, for example of carbon fibers, or the like. Instead of the illustrated blended fabric, it can also be expedient to embody the woven material 8 entirely of electrically conductive threads 7.

Figure 6:
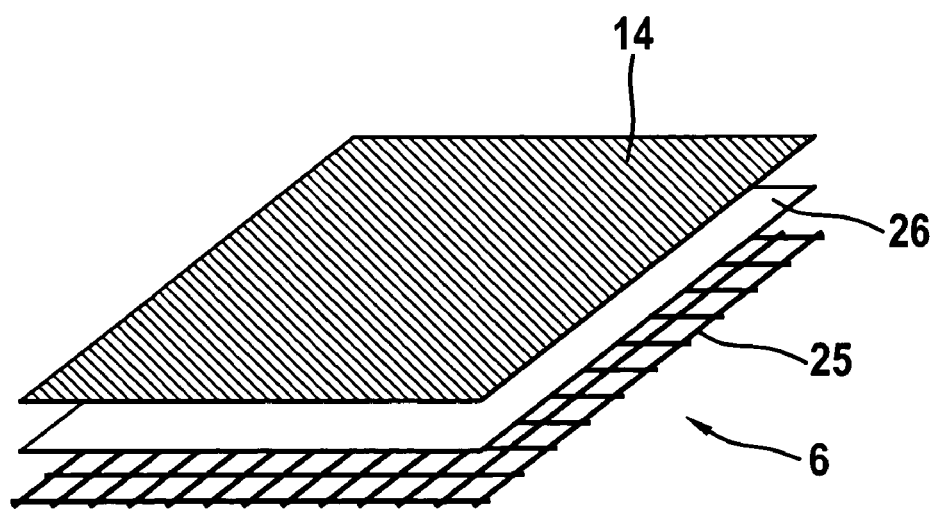
FIG. 6 shows a variant of he potential-equalizing device of FIG. 5 with an electrically conductive film-like coating.

FIG. 6 shows a variation of the potential-equalizing device 6 of FIG. 5, where instead of the flexible woven material 8, a flexible arrangement composed of a support fabric 25 having a film 26 disposed thereon is provided. To form the potential-equalizing device 6, the film 26 is provided with an electrically conductive, film-like coating 14. The illustrated three-layered material, with the support fabric 25, the film 26, and the coating 14, is provided as the material for forming the collection bag 4 (FIG. 2), whereby the film-like coating 14 is disposed on the inner side of the collection bag 4. It can also be expedient to build up the collection bag 4 from some other material, whereby disposed on the inner side of the collection bag 4 is a liner of a material, for example pursuant to FIGS. 5 and 6.

Instead of the illustrated flexible configuration of the potential-equalizing device 6 of FIGS. 5 and 6, it might also be advantageous to have a rigid arrangement, for example in the form of a wire structure, a metal band or the like.

The illustrated suction device/blower can advantageously also be embodied in such a way that there is disposed in the blower tube 3 a venturi device or the like into which a suction tube opens. As a result of the underpressure in the venturi device, there results in the suction or intake tube an intake air stream by means of which nuts, olives or other harvest material as well as other even coarser material can be collected from the ground and conveyed into the collection bag 4. In addition to resulting from the carrier air stream in the blower tube 3, electrical potential differences also result from the intake air stream in the intake tube, which are reliably equalized by the potential-equalizing device 6.

The specification incorporates by reference the disclosure of German priority document 10 2004 009 979.0 filed 02 Mar. 2004.

The present invention is, of course, in no way restricted to the specific disclosure of the specification and drawings, but also encompasses any modifications within the scope of the appended claims.

I claim:

1. A manually-guided, portable suction device/blower, comprising:
   a blower unit having a motor for driving the blower unit;
   a blower tube that extends from the blower unit;
   a collection bag, wherein during suction operation of said suction device/blower, said blower tube opens out into said collection bag; and
   a potential-equalizing device disposed within said collection bag, wherein said potential-equalizing device is electrically conductively connected with an electrical ground connection of said suction device/blower.

2. A suction device/blower according to claim 1, wherein said potential-equalizing device has a flexible configuration.

3. A suction device/blower according to claim 2, wherein said potential-equalizing device is an arrangement of electrically conductive threads.

4. A suction device/blower according to claim 3, wherein said electrically conductive threads are metallic threads.

5. A suction device/blower according to claim 3, wherein said collection bag is produced from woven material that includes said electrically conductive threads.

6. A suction device/blower according to claim 1, wherein said potential-equalizing device is embodied as an electrically conductive, film-like coating of said collection bag.

7. A suction device/blower according to claim 1, wherein said electrical ground connection is formed by said motor.

8. A suction device/blower according to claim 7, wherein said electrical ground connection is formed by a housing of said motor.

9. A suction device/blower according to claim 8, wherein a potential-equalizing conductor is provided and extends from said potential-equalizing device to said housing of said motor on the inside through a discharge elbow, and wherein an end of said potential-equalizing conductor that is in the vicinity of said motor is secured to said motor inside said blower unit in a region of said discharge elbow.

10. A suction device/blower according to claim 9, wherein said end of said potential-equalizing conductor that is in the vicinity of said motor is secured to said motor via a motor mounting bolt.

11. A suction device/blower according to claim 1, wherein a further potential-equalizing device is disposed in said blower tube, and wherein sad first mentioned potential-equalizing device is electrically conductively connected with said further potential-equalizing device.

* * * * *